(12) United States Patent
Mosdzien et al.

(10) Patent No.: US 11,953,056 B2
(45) Date of Patent: Apr. 9, 2024

(54) SHAFT BEARING ASSEMBLY HAVING A PRESSURE REDUCTION DEVICE AND METHOD OF REDUCING A PRESSURE INSIDE A BEARING HOUSING SUPPORTING A SHAFT

(71) Applicant: TURBO SYSTEMS SWITZERLAND LTD., Baden (CH)

(72) Inventors: Moritz Mosdzien, Baden (CH); Andreas Schmid, Gutach (DE); Peter Limacher, Aarau Rohr (CH); Marcel Joho, Auenstein (CH); Wolfgang Joos, Amtzell (DE)

(73) Assignee: TURBO SYSTEMS SWITZERLAND LTD., Baden (CH)

( * ) Notice: Subject to any disclaimer, the term of this patent is extended or adjusted under 35 U.S.C. 154(b) by 0 days.

(21) Appl. No.: 18/018,922

(22) PCT Filed: Jun. 28, 2021

(86) PCT No.: PCT/EP2021/067709
§ 371 (c)(1),
(2) Date: Jan. 31, 2023

(87) PCT Pub. No.: WO2022/028776
PCT Pub. Date: Feb. 10, 2022

(65) Prior Publication Data
US 2023/0296133 A1    Sep. 21, 2023

(30) Foreign Application Priority Data

Aug. 3, 2020 (EP) .................................... 20189222

(51) Int. Cl.
F16C 33/10    (2006.01)
F02B 39/14    (2006.01)

(52) U.S. Cl.
CPC .......... *F16C 33/1045* (2013.01); *F02B 39/14* (2013.01); *F16C 2360/22* (2013.01)

(58) Field of Classification Search
CPC ... F16C 33/1045; F16C 2360/22; F02B 39/14
See application file for complete search history.

(56) References Cited

U.S. PATENT DOCUMENTS

| 5,429,208 A * | 7/1995 | Largillier | F01D 25/20 |
| | | | 60/39.08 |
| 2013/0291828 A1 * | 11/2013 | French | F02D 9/06 |
| | | | 60/602 |

(Continued)

FOREIGN PATENT DOCUMENTS

| EP | 0626503 A1 | 11/1994 |
| EP | 2154348 A2 | 2/2010 |
| EP | 2781704 A1 | 9/2014 |

OTHER PUBLICATIONS

International Search Report and Written Opinion in Application No. PCT/EP2021/067709, dated Nov. 22, 2021, 12 pages.

(Continued)

*Primary Examiner* — Shafiq Mian
(74) *Attorney, Agent, or Firm* — Meunier Carlin & Curfman LLC

(57) ABSTRACT

A shaft bearing assembly having a shaft supported in a bearing housing is described. The shaft bearing assembly includes a pressure reduction device for generating an underpressure inside the bearing housing. The pressure reduction device is operated by employing an incompressible fluid. Further, a method of reducing a pressure inside a bearing housing supporting a shaft is described. The method includes using an incompressible fluid for operating a pressure reduction device for generating an underpressure inside the bearing housing.

16 Claims, 3 Drawing Sheets

(56) References Cited

U.S. PATENT DOCUMENTS

2014/0248125 A1* 9/2014 Wang ................... F02C 7/06
　　　　　　　　　　　　　　　　　　　　　　　415/110
2018/0340546 A1* 11/2018 Lin ................... F04D 29/063

OTHER PUBLICATIONS

Search Report in European Application No. 20189222.1, dated Jan. 28, 2021, 6 pages.

* cited by examiner

SHAFT BEARING ASSEMBLY HAVING A PRESSURE REDUCTION DEVICE AND METHOD OF REDUCING A PRESSURE INSIDE A BEARING HOUSING SUPPORTING A SHAFT

TECHNICAL FIELD

Embodiments of the present disclosure relate to shaft bearing assemblies having a shaft supported in a bearing housing, in particular of a turbo compound or charging system, for example, employed for an internal combustion engine. Further embodiments of the present disclosure relate to methods of reducing a pressure inside a bearing housing supporting a shaft.

BACKGROUND

Charging systems such as exhaust gas turbochargers are known to be used for increasing the power of an internal combustion engine. In such an exhaust gas turbocharger, a turbine is provided in the exhaust gas path of the internal combustion engine, and a compressor is arranged upstream of the internal combustion engine, which is connected to the turbine via a common shaft. The shaft is typically supported by a shaft bearing supported in a bearing housing, Thus, an exhaust gas turbocharger is generally constituted by a rotor, a bearing assembly for the shaft, flow-guiding housing sections (compressor housing and turbine housing) and a bearing housing. The rotor includes a shaft, an impeller and a turbine wheel.

With charging of an internal combustion engine by means of an exhaust gas turbocharger, the capacity and therefore the fuel mixture in the cylinders are increased and a noticeable power increase for the engine is thereby gained. Optionally, the energy which is stored within the exhaust gas of an internal combustion engine can be converted into electrical or mechanical energy by means of a power turbine. In this case, instead of a compressor, as in the case of the exhaust gas turbocharger, a generator or a mechanical consumer is connected to the turbine shaft.

Because of the high process pressure in the turbine-side and in the compressor-side flow region, the shaft of the exhaust gas turbocharger is sealed with a suitable sealing concept in relation to the cavity of the bearing housing. The internal pressure in the cavity of the bearing housing usually corresponds to the atmospheric pressure. The gas pressure in the flow passage of the compressor side and turbine side depends, however, upon the current operating point of the exhaust gas turbocharger and at most operating points lies above the pressure in the cavity of the bearing housing. In certain cases, however, a negative pressure is also to be taken into consideration, for example, in partial load operation or at rest.

Typically, the lubricating oil supplied to the bearings and cooling holes accumulates inside the bearing casing, from where it flows off out of the bearing casing through the oil drain. A shaft seal between bearing casing and turbine or compressor is used to avoid oil leakage into the gas paths of these components. Typically, such a shaft seal comprises non-contacting sealing elements such as a pre-drain, one or more oil catch chambers and one or more seal rings. However, it has been found that conventional sealing concepts like the ones mentioned above still are not fully oil tight.

Especially in idling or part load conditions of an internal combustion engine, slight pressures of only few millibars above atmospheric pressure can occur inside the bearing casing. In addition, when operating in these conditions, the pressure on the compressor or turbine side can fall below atmospheric pressure, which means that the pressure inside the bearing casing is higher than the one on the compressor or turbine side and a positive pressure gradient over the shaft seals occurs. The positive pressure gradient is often the main driver for oil leakage, as air and oil are sucked through the seal from the bearing casing into the gas paths of the components. For that reason there is a high demand for avoiding such conditions, where the pressure difference across the seal is positive. However, it has been found that the conventional implementations of shaft bearing assemblies with baffle plates still have some problems with respect to sealing performance, for example in that the oil leaves in the undesired axial direction. Accordingly, for various applications, there is a demand for shaft bearing assemblies with improved sealing performance.

SUMMARY

In light of the above, a shaft bearing assembly for a shaft supported in a bearing housing and a method of reducing a pressure inside a bearing housing supporting a shaft according to the independent claims are provided. Further aspects, advantages, and features are apparent from the dependent claims, the description, and the accompanying drawings.

More specifically, according to an aspect of the present disclosure, a shaft bearing assembly is provided. The shaft bearing assembly has a shaft supported in a bearing housing. Further, the shaft bearing assembly includes a pressure reduction device for generating an underpressure inside the bearing housing. The pressure reduction device is operated by employing an incompressible fluid.

Accordingly, compared to the state of the art, a shaft bearing assembly is provided which is improved with respect to its sealing performance. In particular, embodiments of the shaft bearing assembly as described herein beneficially avoid the occurrence of positive pressure gradient across bearing housing interfaces, particularly across shaft seals.

Hence, by employing a shaft bearing assembly according to embodiments as described herein in a turbo compound and/or in a charging system an improved turbo compound and/or a charging system can be provided. Accordingly, an improved internal combustion engine can be provided by providing a turbo compound and/or a charging system having a shaft bearing assembly according to any embodiments described herein.

According to another aspect of the present disclosure, a method of reducing a pressure inside a bearing housing supporting a shaft is provided. The method includes using an incompressible fluid for operating a pressure reduction device for generating an underpressure inside the bearing housing.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following.

DETAILED DESCRIPTION OF EMBODIMENTS

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment can apply to a corresponding part or aspect in another embodiment as well.

Figure 1:
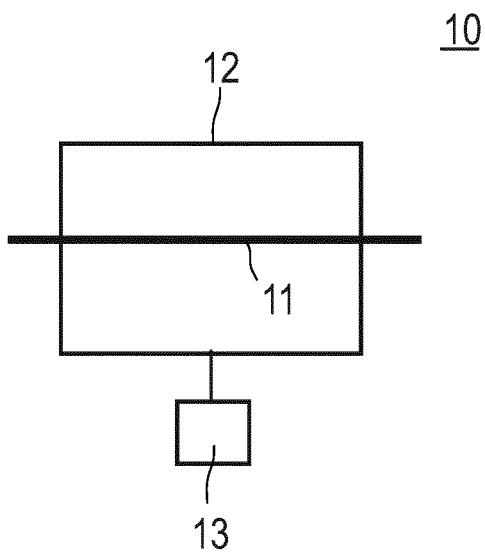
FIG. 1 shows a schematic illustration of a shaft bearing assembly according to embodiments described herein including a pressure reduction device.

With exemplary reference to FIG. 1, a shaft bearing assembly 10 according to the present disclosure is described. According to embodiments which can be combined with any other embodiments described herein, the shaft bearing assembly 10 has a shaft 11 supported in a bearing housing 12. Further, the shaft bearing assembly 10 includes a pressure reduction device 13 for generating an underpressure inside the bearing housing 12. In this regard, it is to be noted that the expression "underpressure inside the bearing housing" is to be understood in that the pressure inside the bearing housing is lower than outside of the bearing housing. Typically, the outside of the bearing housing is at atmospheric pressure. Accordingly, an "underpressure" may be understood as a pressure below atmospheric pressure. The pressure reduction device 13 is operated by employing an incompressible fluid. In particular, the incompressible fluid can be oil. In this regard, it is to be noted that a pressure reduction device 13 being operated by employing an incompressible fluid is to be understood in that the incompressible fluid is used as working fluid for operating the pressure reduction device, particularly for providing energy for operating the pressure reduction device.

Accordingly, beneficially a shaft bearing assembly with an improved scaling performance is provided. In particular, the implementation of a bearing assembly with a pressure reduction device as described herein beneficially provides for avoiding the occurrence of a positive pressure gradient across bearing housing interfaces, e.g. shaft seals.

According to embodiments which can be combined with any other embodiments described herein, the pressure reduction device 13 is based on the principle of a jet pump. In other words, the pressure reduction device can be understood as a device working on the principle of a jet pump. The pressure reduction device 13 is configured to produce and maintain an underpressure inside the bearing housing 12. In particular, the generation of underpressure inside the bearing housing 12 by the pressure reduction device 13 is based on the effect that a jet stream is injected with high kinetic energy (so called driving flow), which in turn allows a momentum exchange with a suction fluid, e.g. oil, for providing a suction flow. In particular, typically the suction fluid consists Out of oil (e.g. from bearings and, for example, cooling holes) and working fluid, particularly air or exhaust gas, of the turbocharger or turbocompound, respectively. Thereby, the suction fluid gets accelerated and the desired underpressure can be generated. In this regard, it is to be noted that typically the oil supply of an internal combustion engine is under pressure of several bars, which provides a sufficient energy reservoir since for the suction effect only a few millibars are needed. Accordingly, beneficially there is no need for the pressure reduction device to operate at a high efficiency level, since the energy reservoir provided by the oil supply is significantly larger than the energy needed for operating the pressure reduction device. In other words, for the case of the pressure reduction device being based on the working principle of a jet pump, it may be less relevant whether all basic elements of a jet pump like for example suction chamber, mixing throat or diffuser are finally considered or whether they are designed within well-known design criteria. In this regard, it is to be noted that there are various installation possibilities for the pressure reduction device.

According to embodiments which can be combined with any other embodiments described herein, the pressure reduction device 13 is configured to be operated by a driving oil flow and a suction oil flow. The driving oil flow is provided by oil provided from an oil supply for providing oil to the bearings of the shaft bearing assembly. The suction oil flow is provided by oil that flows out of the bearings. More specifically, the suction oil flow may be provided by oil that out of the bearings and cooling holes. In particular, depending on the field of application (e.g. medium speed applications), cooling holes or cooling bores may be provided in the bearing casing on the turbine side. The cooling holes are fed by oil of the turbocharger, to cool down the temperature level of the turbine sided walls, e.g. by spray cooling. In other words, like bearings, e.g. radial or axial bearings, the cooling holes act like an additional "oil consumer" and thus, in the case they are implemented, contribute to the suction flow of the pressure reduction device, e.g. a jet pump.

Figure 2:
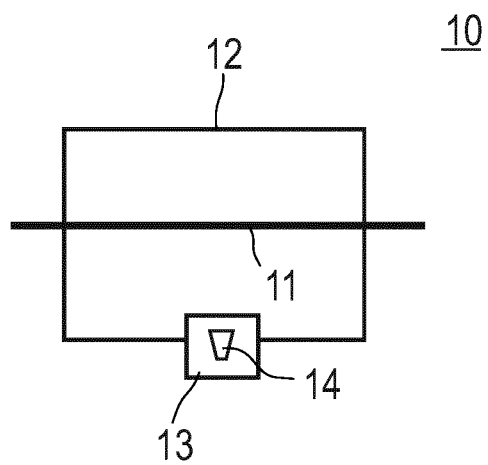
FIG. 2 shows a schematic illustration of a shaft bearing assembly according to further embodiments described herein, wherein the pressure reduction device is at least partially integrated in the bearing housing.

With exemplary reference to FIG. 2, according to embodiments which can be combined with any other embodiments described herein, the pressure reduction device 13 includes at least one nozzle 14. During operation of the pressure reduction device 13, oil provided from an external oil supply is provided through the at least one nozzle 14. In particular, the oil may be understood as working fluid for the pressure reduction device and the at least one nozzle 14 is used for generating a jet stream. Typically, the nozzle is fed by oil of an oil supply. For example, the oil supply can be the oil supply for the bearings of the shaft bearing assembly. More generally, the oil supply can be an oil supply of a turbo compound and/or a charging system, for instance of an internal combustion engine. The oily supply may be an internal oil supply or an external oil supply.

According to embodiments which can be combined with any other embodiments described herein, the at least one nozzle 14 is selected from the group consisting of: a single jet nozzle, a multiple jet nozzle (e.g. a double jet nozzle), a annular ring nozzle, a nozzle configured for injecting a jet stream as swirl flow, and a lobed nozzle.

According to embodiments which can be combined with any other embodiments described herein, the pressure reduction device 13 is connected with the bearing housing 12. In particular, the pressure reduction device 13 may include a suction chamber which may be connected via a tube fitting with the bearing housing.

Figure 3:
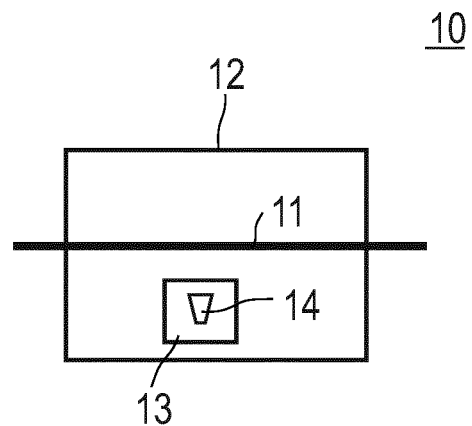
FIG. 3 shows a schematic illustration of a shaft bearing assembly according to further embodiments described herein, wherein the pressure reduction device is provided inside the bearing housing.
Figure 4:
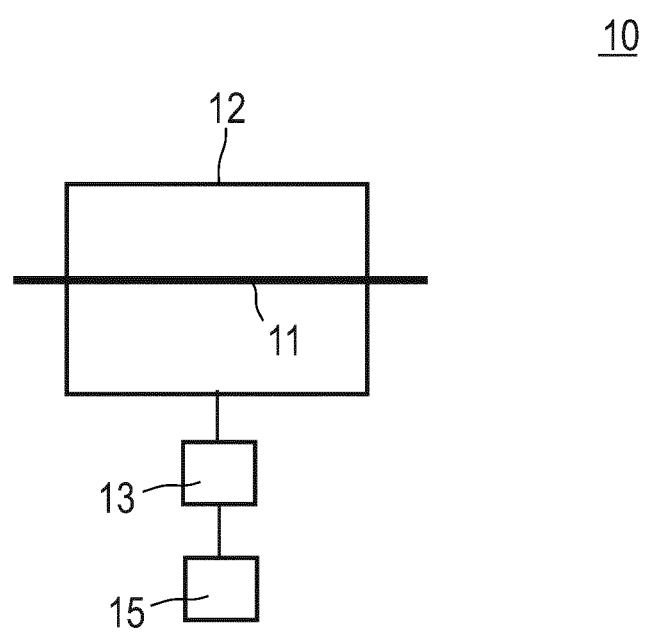
FIG. 4 shows a schematic illustration of a shaft bearing assembly according to further embodiments described herein having a pressure reduction device and at least one further pressure reduction device connected in series.

With exemplary reference to FIG. 3, according to embodiments which can be combined with any other embodiments described herein, the pressure reduction device 13 is at least partially integrated in the bearing housing 12. In other words, the pressure reduction device 13 can be fully or partly integrated in the bearing housing 12. Accordingly, beneficially a more space saving design can be provided. Alternatively, as schematically illustrated in FIG. 4, the pressure reduction device 13 can be provided inside the bearing housing 12. Accordingly, the pressure reduction device 13 may be arranged and configured for generating a local lower pressure inside the bearing housing 12.

Figure 5:
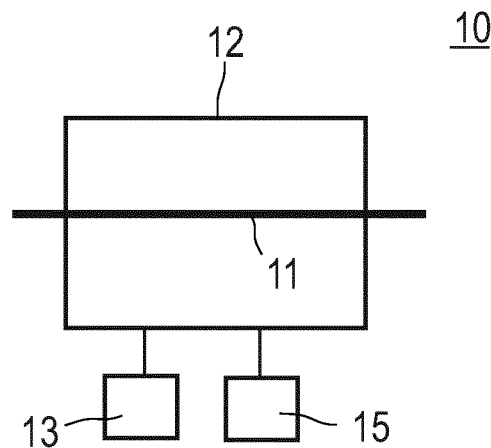
FIG. 5 shows a schematic illustration of a shaft bearing assembly according to further embodiments described herein having a pressure reduction device and at least one further pressure reduction device connected in parallel.

According to embodiments which can be combined with any other embodiments described herein, the shaft bearing assembly 10 may further include one or more further pressure reduction devices 15, as schematically shown in FIG. 4. For example, the one or more further pressure reduction devices 15 can be connected in series with the pressure reduction device 13, as show in FIG. 4. Additionally or alternatively, the one or more further pressure reduction devices 15 can be connected in parallel with the pressure reduction device 13, as exemplarily shown in FIG. 5.

Figure 6:
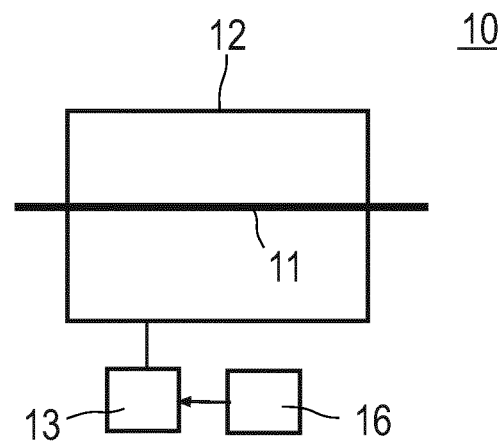
FIG. 6 shows a schematic illustration of a shaft bearing assembly according to further embodiments described herein having a pressure controller for controlling the underpressure generated by the pressure reduction device.

With exemplary reference to FIG. 6, according to embodiments which can be combined with any other embodiments described herein, the shaft bearing assembly 10 includes a controller 16 for controlling the underpressure generated by the pressure reduction device 13 and/or the one or more further pressure reduction devices 15. The controller may be an actively driven controller or a passively driven controller. For instance, the controller can be configured for setting up the suction pressure of the pressure reduction device. Further, the controller may be configured for switching the pressure reduction device on or off.

Figure 7:
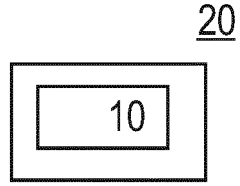
FIG. 7 shows a schematic illustration of an in internal combustion engine including a shaft bearing assembly according to any embodiments described herein.

Hence, in view of the embodiments of the shaft bearing assembly as described herein, it is to be understood that by employing the shaft bearing assembly as described herein in a turbo compound and/or in a charging system an improved turbo compound and/or a charging system can be provided. Accordingly, an improved internal combustion engine can be provided by providing a turbo compound and/or a charging system having a shaft bearing assembly according to any embodiments described herein. FIG. 7 schematically shows an internal combustion engine 20 including a shaft bearing assembly 10 according to any embodiments described herein.

Figure 8A:
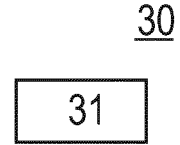
FIGS. 8A and 8B show block diagrams for illustrating embodiments of a method of reducing a pressure inside a bearing housing as described herein.
Figure 8B:
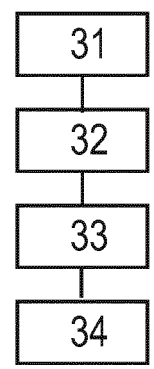

With exemplary reference to the block diagrams shown in FIGS. 8A and 8B, embodiments of a method 30 of reducing a pressure inside a bearing housing 12 supporting a shaft 11 according to the present disclosure are described. According to embodiments which can be combined with any other embodiments described herein, the method 30 includes using (represented by block 31 in FIG. 8A) an incompressible fluid for operating a pressure reduction device 13 for generating an underpressure inside the bearing housing 12.

According to embodiments of the method 30 which can be combined with any other embodiments described herein, using (represented by block 31 in FIG. 8A) the incompressible fluid for operating the pressure reduction device 13 includes providing (represented by block 32 in FIG. 8B) a driving oil flow and a suction oil flow for operating the pressure reduction device 13. The driving oil flow is provided by oil from an oil supply for the bearings. The suction oil flow is provided by oil flowing out of the bearings.

According to embodiments which can be combined with any other embodiments described herein, the method 30 further includes using (represented by block 33 in FIG. 8B) the incompressible fluid for operating one or more further pressure reduction devices 15. As exemplarily described with reference to FIGS. 4 and 5, the one or more further pressure reduction devices 15 can be connected in parallel and/or in series with the pressure reduction device 13.

According to embodiments which can be combined with any other embodiments described herein, the method 30 further includes controlling (represented by block 34 in FIG. 8B) the underpressure generated by the pressure reduction device 13 by using a controller 16. Additionally, the method may include controlling the underpressure generated by the one or more further pressure reduction devices 15. In particular, controlling of the pressure reduction device 13 and/or of the one or more further pressure reduction devices 15 can be done by using a mechanical working valve (e.g. a spring valve) for controlling, for example, the difference pressure across the sealing. Accordingly, the occurrence of the above mentioned positive pressure gradient can be avoided. Further, the pressure build-up of the pressure reduction device 13 and/or of the one or more further pressure reduction devices 15 could directly be controlled by using a mechanical valve. It is to be noted that instead of a mechanical working controller, an electrical device could be employed. Further, it is to be understood that there are several possibilities for controlling the pressure reduction device 13 and/or the one or more further pressure reduction devices 15. For example, depending on the turbocharger operating point, a purely hydraulic control via the differential pressure of the bearing point may be used.

Further, a purely electrically controlled valve, e.g. in the driving flow supply of the pressure reduction device 13 and/or the one or more further pressure reduction devices 15, can be used to control the pressure reduction device 13 and/or the one or more further pressure reduction devices 15. In this case, the driving flow is controlled via the turbocharger speed or the operating point of the turbocharger, which has the advantage that switching off the pressure reduction device 13 and/or the one or more further pressure reduction devices 15 is easy to realize for uncritical turbocharger operating points.

In view of the embodiments described herein, it is to be understood that beneficially a shaft bearing assembly as well as a method is provided with which, compared to the state of the art, an improved sealing performance can be obtained. In particular, embodiments as described herein beneficially avoid occurrence of positive pressure gradients across bearing housing interfaces, particularly across shaft seals.

While the foregoing is directed to embodiments, other and further embodiments may be devised without departing from the basic scope, and the scope is determined by the claims that follow.

LIST OF REFERENCE NUMBERS 10 shaft bearing assembly
11 shaft
12 bearing housing
13 pressure reduction device
14 nozzle
15 one or more further pressure reduction devices
16 pressure controller
20 internal combustion engine
10 30 method of reducing a pressure inside a bearing housing
31-34 bucks of block diagram for illustrating the method of reducing a pressure inside a bearing housing

The invention claimed is:

1. A shaft bearing assembly having a shaft supported in a bearing housing, comprising a pressure reduction device for generating an underpressure inside the bearing housing, the pressure reduction device being operated by employing oil.

2. The shaft bearing assembly of claim 1, wherein the pressure reduction device is based on the principle of a jet pump.

3. The shaft bearing assembly of claim 1, wherein the pressure reduction device is configured to be operated by a driving oil flow and a suction oil flow, wherein the driving oil flow is provided by oil provided from an oil supply for the bearings of the shaft bearing assembly, and wherein the suction oil flow is provided by oil flowing out of the bearings.

4. The shaft bearing assembly of claim 1, wherein the pressure reduction device comprises at least one nozzle, and wherein oil of an external oil supply is provided through the at least one nozzle during operation of the pressure reduction device.

5. The shaft bearing assembly of claim 4, wherein the at least one nozzle is selected from the group consisting of: a single jet nozzle, a multiple jet nozzle, a annular ring nozzle, a nozzle configured for injecting a jet stream as swirl flow, and a lobed nozzle.

6. The shaft bearing assembly of claim 1, wherein the pressure reduction device is connected with the bearing housing.

7. The shaft bearing assembly of claim 1, wherein the pressure reduction device is at least partially integrated in the bearing housing, or wherein the pressure reduction device is provided inside the bearing housing.

8. The shaft bearing assembly of claim 1, further comprising one or more further pressure reduction devices, the one or more further pressure reduction devices being connected in parallel with the pressure reduction device.

9. The shaft bearing assembly of claim 1, further comprising a controller for controlling the underpressure generated by the pressure reduction device.

10. The shaft bearing assembly of claim 1, further comprising one or more further pressure reduction devices, the one or more further pressure reduction devices being connected in series with the pressure reduction device.

11. An internal combustion engine comprising at least one of a turbo compound and a charging system having a shaft bearing assembly, the shaft bearing assembly having a shaft supported in a bearing housing, comprising a pressure reduction device for generating an underpressure inside the bearing housing, the pressure reduction device being operation by employing oil.

12. A method of reducing a pressure inside a bearing housing supporting a shaft, the method comprising using oil for operating a pressure reduction device for generating an underpressure inside the bearing housing.

13. The method of claim 12, wherein using the oil for operating the pressure reduction device comprises providing a driving oil flow and a suction oil flow for operating the pressure reduction device, the driving oil flow being provided by oil from an oil supply for the bearings, and the suction oil flow being provided by oil flowing out of the bearings.

14. The method of claim 12, further comprising using the incompressible fluid for operating one or more further pressure reduction devices, the one or more further pressure reduction devices being connected in parallel with the pressure reduction device.

15. The method of claim 12, further comprising controlling the underpressure generated by the pressure reduction device by using a controller.

16. The method of claim 12, further comprising using the incompressible fluid for operating one or more further pressure reduction devices, the one or more further pressure reduction devices being connected in series with the pressure reduction device.

* * * * *